United States Patent
Yanagase

(10) Patent No.: US 6,936,348 B1
(45) Date of Patent: Aug. 30, 2005

(54) METHOD FOR DEPOSITION OF RUTILE-TYPE TITANIUM DIOXIDE, AND SUBSTRATE AND GLASS FLAKES HAVING THE OXIDE ATTACHED THERETO

(75) Inventor: Shigeru Yanagase, Ichishigun (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/169,564

(22) PCT Filed: Nov. 10, 2000

(86) PCT No.: PCT/JP00/07951

§ 371 (c)(1),
(2), (4) Date: Jan. 16, 2003

(87) PCT Pub. No.: WO02/38501

PCT Pub. Date: May 16, 2002

(51) Int. Cl.⁷ .............................. B32B 9/00; B05D 3/10
(52) U.S. Cl. ................. 428/432; 428/434; 428/689; 428/699; 428/701; 428/702; 427/212; 427/215; 427/301; 427/430.1; 427/443.2
(58) Field of Search ................. 427/301, 212, 427/215, 430.1, 443.2; 428/426, 432, 433, 434, 689, 699, 702, 707, 697, 701; 106/403, 415, 436, 437, 441, 482

(56) References Cited

U.S. PATENT DOCUMENTS

| | | | | |
|---|---|---|---|---|
| 3,711,308 A | * | 1/1973 | Brand et al. | 106/417 |
| 3,957,526 A | * | 5/1976 | Hodgkin et al. | 106/445 |
| 4,038,099 A | * | 7/1977 | DeLuca et al. | 106/417 |
| 4,086,100 A | * | 4/1978 | Esselborn et al. | 106/417 |
| 4,225,564 A | * | 9/1980 | Tolley | 423/81 |
| 4,275,118 A | * | 6/1981 | Baney et al. | 428/412 |
| 4,552,593 A | * | 11/1985 | Ostertag | 106/417 |
| 5,221,341 A | * | 6/1993 | Franz et al. | 106/449 |
| 5,433,779 A | * | 7/1995 | DeLuca, Jr. | 106/418 |
| 5,436,077 A | * | 7/1995 | Matsuba et al. | 428/404 |
| 5,595,813 A | * | 1/1997 | Ogawa et al. | 428/212 |
| 5,753,371 A | * | 5/1998 | Sullivan et al. | 428/406 |
| 6,045,914 A | * | 4/2000 | Sullivan et al. | 428/404 |
| 6,369,147 B1 | * | 4/2002 | Polonka et al. | 106/403 |

FOREIGN PATENT DOCUMENTS

| | | |
|---|---|---|
| JP | 01-224220 A | 9/1989 |
| JP | 03-285821 A | 12/1991 |
| JP | 07-000819 | * 1/1995 |
| JP | 10-139482 A | 5/1998 |
| JP | 10-297921 A | 11/1998 |
| JP | 10-297921 | * 11/1998 |
| JP | 2000-328251 A | 11/2000 |

* cited by examiner

*Primary Examiner*—Deborah Jones
*Assistant Examiner*—G. Blackwell-Rudasill
(74) *Attorney, Agent, or Firm*—Frishauf, Holtz, Goodman & Chick, P.C.

(57) ABSTRACT

The present invention relates to a method of depositing rutile type titanium dioxide, and a substrate and glass flakes having rutile type titanium dioxide obtained using the method fixed thereto. An object of the present invention is to make heating essentially unnecessary and simplify the manufacturing process, thus reducing costs, and also enable rutile type titanium dioxide to be fixed easily even to a substrate having low heat resistance. This object is attained by depositing rutile type crystals from a titanium-containing solution through a neutralization reaction under conditions of a temperature in a range of 55 to 85° C. and a pH of not more than 1.3.

13 Claims, No Drawings

METHOD FOR DEPOSITION OF RUTILE-TYPE TITANIUM DIOXIDE, AND SUBSTRATE AND GLASS FLAKES HAVING THE OXIDE ATTACHED THERETO

This application is a U.S. National Phase Application under 35 U.S.C. 371 of International Application No. PCT/JP00/07951 filed Nov. 10, 2000.

TECHNICAL FIELD

The present invention relates to a method of depositing rutile type crystalline titanium dioxide ($TiO_2$) from a titanium-containing solution through a neutralization reaction, and a substrate and glass flakes having rutile type titanium dioxide obtained using the method fixed thereto.

BACKGROUND ART

Titanium dioxide has three crystalline types, anatase, brookite and rutile. Of these, the anatase and rutile types are manufactured industrially. As industrial methods of manufacturing titanium dioxide, there are a sulfuric acid method and a chlorine method, but in either case the anatase type is manufactured at first, and the rutile type is then obtained by heating and thus transforming the anatase type. Anatase type titanium dioxide (hereinafter merely referred to as "the anatase type") has a specific gravity of 3.90 and a refractive index of 2.55, whereas rutile type titanium dioxide (hereinafter merely referred to as "the rutile type") has a specific gravity of 4.20 and a refractive index of 2.70. Titanium dioxides of the both crystalline types are used in white paints, coating agents for paper, and colorants for plastics or rubber.

The anatase type is a crystallographically unstable form, and is pure white, showing virtually no optical absorbance up to 400 nm. The rutile type, on the other hand, is a stable form, is also more chemically stable than the anatase type and is highly robust after use, and has a slightly yellowish hue and is excellent in terms of tinting strength and hiding power. The anatase type and the rutile type each have their own characteristic features, and are used in accordance with these characteristic features. One usage of titanium dioxide is as a protective film on a substrate; in this case weather resistance and durability are required, and hence the rutile type is more suitable than the anatase type. Moreover, there are also cases in which such a film is used as an interference color film that makes any of various colors appear on a substrate through interference of visible light reflected at the film surface and the substrate interface. The rutile type is more suitable than the anatase type for such an interference color film, since the higher the refractive index, and the more dense and the more uniform, then the better the coloration.

For the above reasons, research has been carried out from hitherto into methods of manufacturing rutile type titanium dioxide films, but all such methods have involved first manufacturing the anatase type and then transforming this into the rutile type by heating. For example, there is a method in which a titanium tetrachloride ($TiCl_4$) solution and a substrate are brought into contact with one another, and then in this state an alkali metal hydroxide is added to the solution, thus depositing anatase type titanium dioxide. In this method, tin oxide or iron oxide is put into the solution as a crystalline type transformation promoter, but even so heating to at least about 800° C. is necessary, resulting in the manufacturing process becoming complex and the manufacturing cost increasing. Furthermore, there are problems such as it not being possible to use the method on a substrate that cannot withstand the above temperature.

In view of such problems, it is an object of the present invention to provide a method of depositing rutile type titanium dioxide through a neutralization reaction, according to which heating for crystalline type transformation is essentially unnecessary and the manufacturing process is simplified, and thus costs can be reduced, and moreover rutile type titanium dioxide can easily be fixed even to a substrate having low heat resistance; furthermore, it is also an object of the present invention to provide a substrate, in particular glass flakes, to which rutile type titanium dioxide has been fixed using this deposition method.

To attain the above object, a first embodiment of the invention is characterized in that rutile type crystals are deposited through a neutralization reaction from a titanium-containing solution having a temperature in a range of 55 to 85° C. and a pH of not more than 1.3.

According to the first embodiment of the invention, crystals are deposited through a neutralization reaction from a titanium-containing solution having a temperature in a range of 55 to 85° C. and a pH of not more than 1.3, and hence rutile type titanium dioxide or a hydrate thereof can be deposited reliably.

A second embodiment of the invention is characterized in that tin or a tin compound is attached to a substrate.

DISCLOSURE OF THE INVENTION

According to the second embodiment of the invention additional to the first embodiment of the invention tin is attached to a substrate, and hence the substrate surface is activated, and thus the rutile type titanium dioxide can be attached to the substrate reliably.

A third embodiment of the invention is characterized in that, in the case of the first or second embodiments of the invention at least one member (hereinafter referred to as a metal selected from the group consisting of platinum, platinum compounds, palladium and palladium compounds is attached to a substrate.

According to the third embodiment of the invention, additional to the method of the first or second embodiments of the invention, a P metal is attached to a substrate, and hence due to the affinity between the P metal and rutile type titanium dioxide, the rutile type titanium dioxide can be fixed to the substrate stably.

A fourth embodiment of the invention is characterized in that, in the case of the second or third embodiments of the invention, the tin or a tin compound is attached to the substrate in an amount of 5 to 5,000 $\mu g/m^2$.

According to the fourth embodiment of the invention, additional to the method of the second or third embodiments of the invention, the tin or tin compound is attached to the substrate in an amount of 5 to 5,000 $\mu g/m^2$, and hence the rutile type titanium dioxide film can be formed more densely and more effectively.

A fifth embodiment of the invention is characterized in that, in the case of the third or fourth embodiments of the invention, the P metal is attached to the substrate in an amount of 1 to 1,000 $\mu g/m^2$.

According to the fifth embodiment of the invention, additional to the method of the third or fourth embodiments of the invention, the P metal is attached to the substrate in an amount of 1 to 1,000 $\mu g/m^2$, and hence the rutile type titanium dioxide film can be formed more densely and more effectively.

A sixth embodiment of the invention is characterized in that rutile type titanium dioxide deposited using the method in any one of the first to the fifth embodiments of the invention is fixed to a substrate.

According to a sixth embodiment of the invention, the substrate has fixed thereto a rutile type titanium dioxide obtained using the method in any one of the first to the fifth embodiments of the invention, and hence a substrate having a protective film or an interference color film that is dense and uniform and has high chemical stability and refractive index can be obtained easily.

A seventh embodiment of the invention, is characterized in that the substrate as in the sixth embodiment of the invention having a rutile type titanium dioxide fixed thereto comprises glass flakes.

According to the seventh embodiment of the invention, glass flakes can be obtained as a substrate showing no cleavage, having high strength and surface smoothness, and having excellent properties as a pigment.

An eighth embodiment of the invention, is characterized in that a P metal and rutile type titanium dioxide are fixed to glass flakes.

According to the eighth embodiment of the invention, a P metal and rutile type titanium dioxide are fixed to glass flakes, and hence a pearl pigment or reflective material of improved performance can be obtained.

BEST MODES FOR CARRYING OUT THE INVENTION

A detailed description will now be given of modes for carrying out the present invention.

The present invention is directed to a method in which rutile type titanium dioxide is deposited through a neutralization reaction from a titanium-containing solution having a temperature in a range of 55 to 85° C. and a pH (hydrogen ion concentration index) of not more than 1.3. It has been known from hitherto that the crystalline type of the titanium dioxide deposited varies according to the temperature, pH and so on of the titanium-containing solution, but specific conditions for depositing the rutile type were not known. The present inventors thus carried out many experiments, making various changes to the conditions of the titanium-containing solution, and as a result discovered conditions under which the rutile type is deposited reliably.

Specifically, in the case that the temperature of the titanium-containing solution is lower than 55° C., titanium dioxide is not deposited even if the pH of the titanium-containing solution is 1.3 or less. On the other hand, in the case that the temperature of the titanium-containing solution is higher than 85° C., the anatase type or the brookite type is deposited, but the rutile type is not deposited.

Moreover, in the case that the pH of the titanium-containing solution is greater than 1.3, only the anatase type is deposited even if the temperature of the titanium-containing solution is in a range of 55 to 85° C. On the other hand, if the pH of the titanium-containing solution is not more than 1.3 and the temperature of the titanium-containing solution is in a range of 55 to 85%, then the rutile type is deposited reliably. Note that there is no particular limitation on the lower limit of the pH for depositing the rutile type, but from the viewpoint of maintaining the titanium-containing solution production equipment the pH is preferably not less than 0.5.

There are no particular limitations on the types of the solute and the solvent in the titanium-containing solution. As the solute, for example titanium tetrachloride, titanium trichloride, titanyl-sulfate, or a titanium alkoxide such as titanium isopropoxide can be used, but it is preferable to use titanium tetrachloride, for which the proportion of the rutile type deposited is high and moreover an additive such as a oxidizing agent is unnecessary. Moreover, as the solvent, dilute hydrochloric acid or dilute sulfuric acid can be used, and in the case that the solute is a titanium alkoxide, an alcohol such as isopropyl alcohol can be used. Regarding these solutes and solvents, a plurality may be used in combination in accordance with the compatibility with the substrate and the objective. Moreover, there are no particular limitations on the titanium concentration in the solution; this concentration is adjusted as appropriate depending on the neutralization reaction such that the pH of the titanium-containing solution does not exceed 1.3, and to prevent coagulation of the rutile type titanium dioxide in the solution. It is undesirable for the rutile type titanium dioxide to coagulate in the solution, since then particles of various diameters will be attached to the substrate surface in a discrete fashion, and hence it will be difficult to form a uniform film.

With the present invention, because rutile type titanium dioxide is deposited, a heating step for crystalline type transformation as used conventionally is essentially unnecessary, but it is not the case that the heating step is precluded. The crystals of the rutile type titanium dioxide deposited out from the solution contain impurities such as hydroxyl groups, and hence the degree of crystallinity is not very high. In the case that the degree of crystallinity is not high, properties of the rutile type titanium dioxide such as chemical stability and high refractive index are not exhibited sufficiently, and hence a heating step may be provided to remove the impurities.

With the present invention, the rutile type titanium dioxide is deposited from a titanium-containing solution through a neutralization reaction, where 'neutralization reaction' refers to a chemical reaction that occurs when an alkaline solution is added to the titanium-containing solution, which is acidic. For example, the rutile type titanium dioxide can be deposited by holding a solution of titanium tetrachloride dissolved in a dilute hydrochloric acid solvent at conditions as described earlier, and instilling a sodium hydroxide solution, a potassium hydroxide solution or an ammonium hydroxide solution into this solution.

The rutile type titanium dioxide deposited from the titanium-containing solution may be purified by filtering the deposit, but in the case that the objective is to attach the rutile type titanium dioxide to a substrate, it is also possible to bring the titanium-containing solution into contact with the substrate, and in this state deposit the rutile type titanium dioxide and hence fix the rutile type titanium dioxide directly onto the substrate. According to this method, a separate step of fixing the rutile type titanium dioxide onto the substrate becomes unnecessary, and hence the manufacturing process can be simplified, and the manufacturing cost can be kept down. The following are examples of methods of directly depositing the rutile type titanium dioxide onto a substrate.

In a first method, a titanium-containing solution is manufactured by dissolving a solute such as titanium tetrachloride in a solvent such as dilute hydrochloric acid, and the temperature and pH of this solution are adjusted to the conditions described above. Next, the solution is brought into contact with the substrate, and in this state an alkaline solution is instilled into the solution, whereupon rutile type titanium dioxide is deposited onto the substrate.

In a second method, an acidic solvent such as dilute hydrochloric acid is brought into contact with the substrate, the temperature and the pH of the acidic solvent are adjusted to the conditions described above, and a titanium-containing solution and an alkaline solution which are separately manufactured are instilled into the acidic solvent. It should be noted that the solution obtained by instilling the titanium-containing solution into the acidic solvent in the second method also constitutes the "titanium-containing solution" of the present invention.

The rutile type titanium dioxide can be deposited onto a substrate using either the first or the second method. However, with the second method, the titanium-containing solution is instilled into a large amount of an acidic solvent, and hence there are advantages that coagulation of the rutile type titanium dioxide in the solution can be prevented effectively, and the thickness of the film of rutile type titanium dioxide on the substrate can be adjusted easily through the amount of the titanium-containing solution instilled. In the case that the second method is used, it is preferable to add the titanium-containing solution into the acidic solvent at a rate in a range of 0.01 to 0.2 g/m$^2$/hour (where this is the weight of titanium added per hour per 1 m$^2$ of the surface area of the substrate). If this adding rate is lower than 0.01 g/m$^2$/hour, then the formation of the rutile type titanium dioxide film will take too much time, whereas if the adding rate is higher than 0.2 g/m$^2$/hour, then coagulation of the rutile type titanium dioxide in the titanium-containing solution will become prone to occur.

Moreover, in the present invention, it is preferable to attach tin or a tin compound (hereinafter referred merely to as "tin") to the substrate. It is not clear what effects tin has on the substrate, but the present inventors have conjectured that tin attached to the substrate activates the surroundings thereof, thus assisting the fixing of the depositing rutile type titanium dioxide onto the substrate. There are no particular limitations on the method of attaching the tin to the substrate, but examples include a method in which tin is mixed into the titanium-containing solution and then the titanium-containing solution is brought into contact with the substrate, and a method in which the substrate is subjected to surface treatment in advance using an acidic tin-containing solution. Of these, the method in which the substrate is subjected to surface treatment in advance is preferable since the tin can be attached to the substrate reliably.

Moreover, in the present invention, it is preferable to attach a P metal, i.e. at least one member selected from the group consisting of platinum, platinum compounds, palladium and palladium compounds, to the substrate. It is thought that such a P metal readily joins to titanium dioxide, and hence readily bonds to the depositing rutile type titanium dioxide, thus promoting the fixing of the rutile type titanium dioxide onto the substrate.

There are no particular limitations on the method of attaching the P metal to the substrate, but as above, a method in which the substrate is subjected to surface treatment in advance using a solution is preferable. The desired effects will be exhibited even if only one of the tin and the P metal is used alone, but by using the tin and the P metal together, the two act in a mutually complementary fashion, and hence more rutile type titanium dioxide can be fixed onto the substrate. Moreover, there are no particular limitations on the order in which the tin and the P metal are attached to the substrate; the attachment of the tin and the P metal may be carried out simultaneously using a mixed solution containing both the tin and the P metal, or may be carried out separately to one another.

In the case that the tin and the P metal are attached to the substrate simultaneously using a mixed solution of the tin and the P metal, it is preferable to make the weight ratio of the tin to the P metal in the mixed solution be in a range of 1 to 10 times, so that the tin and the P metal will be present uniformly over the substrate.

It is preferable to attach the tin to the substrate in an amount in a range of 5 to 5,000 μg/m$^2$ and the P metal in an amount in a range of 1 to 1,000 μg/m$^2$.

If the amount of the tin or the P metal is less than the above range, then the tin or the P metal will not be present sufficiently on the substrate, and hence it will be difficult to fix the rutile type titanium dioxide to the substrate, and moreover it will take a considerable time until the desired amount of rutile type titanium dioxide has been fixed to the substrate. On the other hand, if the amount of the tin or the P metal is greater than the above range, then the tin or the P metal will cover the substrate uniformly, and hence there will be no advantage in attaching more. In particular, platinum is expensive, and hence in terms of cost versus effects it is undesirable to attach an amount greater than the above range. Further, it is more preferable to attach the tin to the substrate in an amount in a range of 10 to 1,000 μg/m$^2$ and the P metal in an amount in a range of 10 to 200 g/m$^2$.

The rutile type titanium dioxide deposited according to the present invention may be used for fixing to a substrate as described above, or may itself be made into a product as rutile type titanium dioxide particles. In the case that the product is rutile type titanium dioxide particles, rutile type titanium dioxide usable in various applications can be provided inexpensively. Moreover, in the case of fixing the rutile type titanium dioxide to a substrate, various effects exhibited by titanium dioxide can be conferred upon the substrate with increased effectiveness. It is known that titanium dioxide decomposes organic matter and shows a bactericidal action through absorption of ultraviolet rays, and utilizing these functions, titanium dioxide is used in antibacterial coatings and the like on building components, tableware and the like. The rutile type titanium dioxide can be fixed onto a substrate uniformly and densely and moreover has high chemical stability, and hence the effects of titanium dioxide described above can be sustained over a prolonged period. A rutile type titanium dioxide film can thus function effectively over a prolonged time as a protective film due to the density and chemical stability, or as an interference color film due to the high refractive index.

There are no particular limitations on the substrate used in the present invention; any kind of substrate for which the effects of rutile type titanium dioxide are required can be used. Moreover, because heating for crystalline type transformation is essentially unnecessary with the present invention, the largest effects are exhibited for a substrate having low heat resistance, i.e. a substrate for which there has been no choice in the past but to use titanium dioxide that has already been transformed into the rutile type. Examples of such substrates include inorganic fibers, organic synthetic resins, organic fibers, natural fibers, natural pulp, and glass.

Out of these substrates, glass is particularly preferable. Glass is used in various applications such as building components, containers, tableware, craft products and so on, and by attaching rutile type titanium dioxide to a product for such an application, new functions can be added to the product such as concealing ability and light reflecting ability. Moreover, according to the present invention, rutile type titanium dioxide, which has high chemical stability, can be manufactured inexpensively, and a uniform and dense film can be provided easily on a glass substrate, and hence glass products having a higher performance and a higher durability than conventional products can be manufactured inexpensively. Many glasses contain considerable amounts of alkali metals and/or alkaline earth metals (hereinafter referred to collectively as "alkaline components"), and by providing a protective film comprised of rutile type titanium dioxide on the surface of such a glass, leaching out of the alkaline components, and hence degradation of the performance of the glass, can be suppressed. There are no particular limitations on the type of glass; for all of an A glass composition, a C glass composition and an E glass composition, a uniform, dense film can be formed on the surface of the glass. Note that glasses of an A glass composition and an E glass composition have low acid resistance, and hence might appear to be unsuited to the present invention. However, the glass substrate is only subjected to an acidic environment for a short time, and hence erosion of the glass surface by the acid is not a problem in practice.

For reference, typical constituent component contents for the A glass composition, the C glass composition and the E glass composition are shown in Table 1.

TABLE 1

|  | A Glass Composition | C Glass Composition | E Glass Composition |
|---|---|---|---|
| $SiO_2$ | 70~73 | 65~72 | 52~56 |
| $Al_2O_3$ | 1.0~1.8 | 1~7 | 12~16 |
| CaO | 7~12 | 4~11 | 16~25 |
| MgO | 1.0~4.5 | 0~5 | 0~6 |
| $B_2O_3$ | — | 0~8 | 5~13 |
| $Na_2O + K_2O$ | 13~15 | 9~17 | 0~0.8 |
| ZnO | — | 0~6 | — |

Units: Weight %

As described above, glass is used in a variety of forms in various applications, but of these forms glass flakes, in which the glass is formed into flake shapes, are most preferable as the substrate of the present invention. Glass flakes have a length of about 5 to 1,000 μm and a thickness of about 0.5 to 20 μm, and are used as a lining material for painting or as a resin reinforcing material. Moreover, glass flakes have a high surface smoothness, and due to having this excellent smoothness, are also used as a pigment. Some pigments are colored themselves, but glass flakes are transparent and reflect visible light, thus giving a product a glittering appearance and a high quality feel. The surface smoothness of glass flakes plays an extremely important role in this visible light reflection. Mica, which is a similar pigment, does not have surfaces as smooth as glass flakes, and moreover may crumble through cleavage (the property of splitting along a plane determined by the crystal structure), and hence the surface-reflected light is prone to being scattered. Furthermore, mica contains a lot of impurities such as iron, and hence when mixed into a resin or paint, causes products to have a dull appearance. Moreover, mica has a high heat resistance of over 1,000° C., and is thus superior in the sense that a film comprised of rutile type titanium dioxide can be formed even if the present invention is not used, but is inferior to glass flakes in terms of visible light reflecting performance and giving products a high quality feel. Consequently, because of a combination of the surface smoothness of the glass flakes, and the uniformity, density and high refractive index of the film comprised of rutile type titanium dioxide, the glass flakes of the present invention give a product a high quality feel due to the improved visible light reflecting ability and the exhibition of any chosen interference color.

The glass flakes of the present invention can function effectively as a pearl pigment utilizing the high refractive index or as a reflective material utilizing the high reflectance. Furthermore, the glass flakes of the present invention do not cleave like mica, and hence the strength is high and the glass flakes are excellent in terms of cleanability.

Note that it can be verified whether or not the present invention has been implemented by looking for the presence of tin or a P metal using an atomic absorption spectrophotometer. Specifically, in the case that the substrate is comprised of glass flakes, the verification can be carried out by completely decomposing the glass flakes to which the rutile type titanium dioxide has been attached in a teflon beaker using a mixed solution of aqua regia and hydrofluoric acid, and subjecting the resulting solution to measurement using an atomic absorption spectrophotometer.

The present invention will now be described in more detail through examples and comparative examples.

[Measurement of Crystalline Type]

EXAMPLE 1

Commercially available glass flakes (made by Nippon Sheet Glass Co., Ltd.: RCF-140) of mean thickness 5 μm and mean particle diameter 140 μm were sieved and graded such that the mean particle diameter became 80 μm, and rutile type titanium dioxide was fixed uniformly and densely to the surfaces of the glass flakes.

[Pretreatment Step]

First, 1.6 g of stannous chloride dihydrate was dissolved in 10l (0.01 m³) of ion exchange water, and then dilute hydrochloric acid was added thereto to adjust the pH to 2.0 to 2.5. 1 kg of the above graded glass flakes was then added to this solution with agitation, and after 10 minutes filtering was carried out. Next, 0.15 g of hydrogen hexachloroplatinate (IV) hexahydrate was dissolved in 10l of ion exchange water, the above filtered glass flakes were put into this solution with agitation, and after 10 minutes filtering was carried out.

[Titanium-Attaching Step]

Next, 0.32l of a (35 wt %) hydrochloric acid solution was added to 10l of ion exchange water, thus manufacturing a hydrochloric acid acidic solution of pH about 1.0. 1 kg of the above pretreated glass flakes was put into this solution with agitation, and the temperature of the solution was raised to 75° C. A titanium tetrachloride ($TiCl_4$) solution was then added to the solution at a rate of 0.2 g/min in terms of Ti, and sodium hydroxide was added in simultaneously such that the pH did not change, whereupon titanium dioxide ($TiO_2$) or a hydrate thereof was deposited onto the glass flakes through a neutralization reaction. Once the titanium dioxide deposited layer on the glass flakes showed a desired interference color, the addition of the titanium tetrachloride solution and the sodium hydroxide was stopped, and the glass flakes were filtered. The glass flakes were then allowed to dry naturally, and then the crystalline formtype was measured without carrying out heating. The crystalline formtype was measured using an X-ray diffractometer (made by Shimadzu Corporation: XD-Dl), and moreover the surface nature of the glass flakes was observed using an electron microscope (made by Hitachi, Ltd.: model S-4500).

EXAMPLE 2 AND COMPARATIVE EXAMPLES 1 TO 7

The glass flakes of Example 2 and Comparative Examples 1 to 7 were prepared using the same procedure as in Example 1, but changing the conditions (temperature and pH) of the titanium-containing solution, and in each case the crystalline formtype was measured and the surface nature was observed.

Table 2 shows the results of the measurement of the crystalline formtype for Examples 1 and 2 and Comparative Examples 1 to 7.

TABLE 2

| Liquid Temperature | pH |  |  |  |  |  |
|---|---|---|---|---|---|---|
|  | 1.5 | | 1 | | 0.5 | |
| 50° C. | Comparative Example 5 | Did Not Precipitate | Comparative Example 6 | Did Not Precipitate | Comparative Example 7 | Did Not Precipitate |
| 75° C. | Comparative Example 1 | Anatase Type | Example 1 | Rutile Type | Comparative Example 2 | Rutile Type |
| 95° C. | Comparative Example 2 | Anatase Type | Comparative Example 3 | Anatase + Rutile Composite Type | Comparative Example 4 | Anatase + Brookite Composite Type |

It was thus found that by adjusting the temperature of the titanium-containing solution to be in a range of 55 to 85° C. and the pH to be not more than 1.3, it is possible to deposit rutile type titanium dioxide reliably and to cover the glass flake surfaces.

Moreover, as is clear from comparing Examples 1 and 2 with Comparative Examples 1 to 7, it was found that in the case that the temperature of the titanium-containing solution is 50° C., because this is less than 5° C., titanium dioxide is not deposited regardless of the pH, and in the case that the temperature of the titanium-containing solution is 95° C., which exceeds 85° C., deposition of titanium dioxide does occur, but it is not possible to deposit rutile type titanium dioxide. Furthermore, it was found that, even if the temperature is in a range of 55 to 85° C., in the case that the pH exceeds 1.3, the anatase type is deposited and it is not possible to deposit rutile type titanium dioxide.

EXAMPLE 3

Glass flakes were manufactured as in Example 1, except that the hydrogen hexachloroplatinate (IV) hexahydrate in the pretreatment step was changed to palladium chloride. Upon measuring the crystalline type of these glass flakes, it was found that a uniform, dense protective film comprised of rutile type titanium dioxide had been formed.

[Measurement of Physical Properties of Glass Flakes]

The glass flakes of Example 1 described above having a rutile type titanium dioxide film were mixed with an acrylic resin (made by Nippon Paint Co., Ltd.: Acryl Autoclear Super), and the resulting mixed solution was applied onto concealment measurement paper, thus forming a coating film. The mixed solution was made by thoroughly mixing with agitation 40 g. (weight of solid component) of the acrylic resin and 10 g of the glass flakes using a paint shaker. This mixed solution was applied onto the concealment measurement paper using a 9-mil applicator to form a coating film. The lightness (L-value) of the coating film was then measured using a color difference meter (made by Minolta Co., Ltd.: CR-300), and the diffuse reflectance (45/0) of the coating film was measured using a gloss meter (made by Nippon Denshoku Industries Co., Ltd.: VGS).

Moreover, glass flakes having a mean thickness of 1 $\mu$m were graded by sieving such that the mean particle diameter became 40 $\mu$m, and using the same methods as described above, rutile type titanium dioxide was attached to the surfaces of the glass flakes, and the lightness and diffuse reflectance of the coating film were measured.

COMPARATIVE EXAMPLE 8

Glass flake physical property measurements were carried out as for Example 1 on commercially available glass flakes having a mean thickness of 5 $\mu$m and a mean particle diameter of 80 $\mu$m and having formed thereon an anatase type titanium dioxide film manufactured using the titanyl sulfate method (made by Nippon Sheet Glass Co., Ltd.: Metashine RCFSX-5080TS(6044)).

Moreover, the lightness and diffuse reflectance of the coating film were also measured for glass flakes having a mean thickness of 1 $\mu$m and a mean particle diameter of 40 $\mu$m and having formed thereon an anatase type titanium dioxide film.

Table 3 shows the measurement results for the lightness and the diffuse reflectance of the coating films of Example 1 and Comparative Example 8.

TABLE 3

| | Item | | | |
|---|---|---|---|---|
| | Lightness According to Color Difference Meter | | Diffuse Reflectance According to Gloss Meter | |
| Substrate Thickness | 5 $\mu$m | 1 $\mu$m | 5 $\mu$m | 1 $\mu$m |
| Example 1 | 62.5 | 63.8 | 24.8 | 21.1 |
| Comparative Example 8 | 53.7 | 54.8 | 13.8 | 14.7 |

As can be seen from Table 3, the brilliance is higher and stronger reflected light is obtained for the rutile type (Example 1) than for the anatase type (Comparative Example 8). The higher the brilliance of the glass flakes, the more a high quality feel is given to a resin or the like into which the glass flakes are mixed.

[Weather Resistance Test]

Next, 5 parts by weight of the glass flakes of each of Example 1 and Comparative Example 8 were mixed into 100 parts by weight of a methacrylate resin (made by Asahi Chemical industry Co., Ltd.: Delpet 60N), a 75×85×3 mm resin sheet was manufactured using an injection molding machine (made by Sumitomo Heavy Industries, Ltd.: Promat 80/40), and the four corners were sealed with aluminum tape. A weather resistance test was carried out on the resin sheet using a carbon arc sunshine weather meter (made by Suga Test Instruments Co., Ltd.) by irradiating with ultraviolet rays for 200 hours or 500 hours with the back panel temperature set to 63±3° C. and the rainfall conditions set to 12 minutes in 60 minutes. Note that this weather resistance test followed JIS B 7753 stipulated in the Japanese Industrial Standards.

After the weather resistance test had been completed, the lightness (L) and the chroma indices (a,b) were measured for after 200 hours' irradiation and after 500 hours' irradiation, and the amount of change ΔE in the lightness (L) and the chroma indices (a,b) was calculated from equation (1).

$$\Delta E = \sqrt{\{(L1-L2)^2 + (a1-a2)^2 + (b1-b2)^2\}} \quad (1)$$

Here, L1, a1 an b1 represent the initial values, and L2, a2 and b2 represent the values after the completion of the weather resistance test (in the present example after 200 hours' irradiation or after 500 hours' irradiation). The smaller the amount of change ΔE, the smaller the change in the color.

Table 4 shows the measurement results for the amount of change ΔE for Example 1 and Comparative Example 8.

TABLE 4

|  | ΔE Value After 200 Hours' Illumination | ΔE Value After 500 Hours' Illumination |
|---|---|---|
| Example 1 | 0.2 | 0.6 |
| Comparative Example 8 | 1.1 | 2.3 |

It was found that the amount of change ΔE for the rutile type even after 500 hours was only about ½ of the amount of change ΔE for the anatase type after 200 hours, and thus that the amount of change ΔE is smaller for the rutile type than for the anatase type. That is, it was found that fading and discoloration are much lower for the rutile type than for the anatase type, i.e. the weather resistance is superior for the rutile type.

[Identification of Tin and P Metal]

1 g of the glass flakes of Example 1 having a rutile type titanium dioxide film was put into a teflon beaker, 16 ml of aqua regia and 10 ml of hydrofluoric acid were added, and heating was carried out to 130° C. on a hot plate, thus carrying out decomposition and exsiccation. The same operation was repeated a plurality of times, thus completely decomposing the glass flakes. The exsiccated material was then dissolved in 10 ml of 20% hydrochloric acid, and dilution was carried out by adding water to 50 ml. The solution was then subjected to atomic absorption spectrometry and furnace analysis using an atomic absorption spectrophotometer (made by Shimadzu Corporation: AA-670° F.). As a result, it was found that 500 $\mu g/m^2$ of tin and 50 $\mu g/m^2$ of platinum had been attached to the glass flakes.

[Effects of Glass Type on Lightness (L) and Chroma Indices (a,b)]

For glass flakes of Example 1 of which a coating film was formed on concealment measurement paper, the lightness (L) and the chroma indices (a,b) were measured using a color difference meter (made by Minolta Co., Ltd.: CR-300). The results are shown in Table 5.

EXAMPLE 4

Commercially available E glass composition glass flakes of mean thickness 5 μm and mean particle diameter 140 μm (made by Nippon Sheet Glass Co., Ltd.: REF-140) were graded by sieving such that the mean particle diameter became 80 μm. Apart from using these glass flakes, rutile type titanium dioxide was fixed uniformly and densely to the surfaces of the glass flakes as in Example 1, a coating film was formed on concealment measurement paper using the same method as described above, and the lightness (L) and the chroma indices (a,b) of the coating film were measured.

EXAMPLE 5

Glass flakes (mean thickness 5 μm) having a normal A glass composition (see Table 1) were formed using a known "balloon method", and grading was carried out such that the mean particle diameter became 80 μm. Apart from using these glass flakes, a coating film was formed on concealment measurement paper using the same method as in Example 4, and the lightness (L) and the chroma indices (a,b) of the coating film were measured.

Table 5 shows the measurement results for Examples 4 and 5.

TABLE 5

|  | White | | | Red | | | Blue | | |
|---|---|---|---|---|---|---|---|---|---|
|  | L | a | b | L | a | b | L | a | b |
| Example 1 | 62.5 | −1.3 | −4.5 | 43.6 | 22.0 | −8.1 | 43.8 | −0.8 | −28.3 |
| Example 4 | 62.8 | −1.5 | −4.7 | 42.3 | 24.8 | −6.5 | 44.2 | −1.7 | −24.9 |
| Example 5 | 63.1 | −1.5 | −4.8 | 43.4 | 21.9 | −6.7 | 45.4 | −3.3 | −29.6 |

As is clear from Table 5, it was found that according to Examples 1, 4 and 5 of the present invention, rutile type titanium dioxide was fixed to the substrate surface uniformly and densely, with there being no effects from the glass type.

INDUSTRIAL APPLICABILITY

Rutile type titanium dioxide deposited according to the present invention can be used for fixing to a substrate such as glass flakes, or the rutile type titanium dioxide can itself be made into a product as rutile type titanium dioxide particles. In the case that the product is rutile type titanium dioxide particles, the rutile type titanium dioxide, which can be used in various applications, can be provided inexpensively. Moreover, in the case of fixing the rutile type titanium dioxide to a substrate, various effects exhibited by titanium dioxide can be conferred upon the substrate with increased effectiveness.

What is claimed is:

1. A method of depositing rutile type titanium dioxide, comprising fixing a uniform and dense film of rutile type titanium dioxide on a glass substrate comprising a glass selected from the group consisting of an A glass, a C glass and an E glass by a neutralization reaction from a titanium-containing solution having a temperature in a range of 55 to 85° C. and a pH of not more than 1.3.

2. A method of depositing rutile type titanium dioxide, comprising attaching tin or a tin compound to a substrate and then depositing rutile type crystals on the substrate by a neutralization reaction from a titanium-containing solution having a temperature of 55 to 85° C. and a pH of not more than 1.3.

3. A method of depositing rutile type titanium dioxide comprising attaching at least one member selected from the group consisting of platinum, a platinum compound, palladium and a palladium compound to a substrate and then depositing rutile type crystals on the substrate by a neutralization reaction from a titanium-containing solution having a temperature of 55 to 85° C. and a pH of not more than 1.3.

4. A method of depositing rutile type titanium dioxide as claimed in claim 2, wherein the tin or tin compound is attached to the substrate in an amount of 5 to 5,000 $\mu g/m^2$.

5. A method of depositing rutile type titanium dioxide as claimed in claim 3, wherein the at least one member selected from the group consisting of platinum, a platinum compound, palladium and a palladium compound is attached to the substrate in an amount of 1 to 1,000 $\mu g/m^2$.

6. Glass flakes having fixed thereto a uniform and dense film of rutile type titanium dioxide and at least one member selected from the group consisting of platinum, a platinum compound, palladium and a palladium compound, wherein the rutile type titanium dioxide is deposited by the method as claimed in claim 3.

7. A method of depositing rutile type titanium dioxide as claimed in claim 2, further comprising attaching at least one member selected from the group consisting of platinum, a platinum compound, palladium and a palladium compound to the substrate, before depositing the rutile type crystals on the substrate.

8. A method of depositing rutile type titanium dioxide as claimed in claim 2, wherein the tin or tin compound is attached to the substrate in an amount of 5 to 5,000 $\mu g/m^2$.

9. A method of depositing rutile type titanium dioxide as claimed in claim 7, wherein the tin or tin compound is attached to the substrate in an amount of 5 to 5,000 $\mu g/m^2$.

10. A method of depositing rutile type titanium dioxide as claimed in claim 4, which further comprises attaching at least one member selected from the group consisting of platinum, a platinum compound, palladium and a palladium compound to the substrate in an amount of 1 to 1,000 $\mu g/m^2$, before depositing the rutile type crystals on the substrate.

11. A method of depositing rutile type titanium dioxide as claimed in claim 7, wherein the at least one member selected from the group consisting of platinum, a platinum compound, palladium and a palladium compound is attached to the substrate in an amount of 1 to 1,000 $\mu g/m^2$.

12. A method of depositing rutile type titanium dioxide as claimed in claim 8, which further comprises attaching at least one member selected from the group consisting of platinum, a platinum compound, palladium and a palladium compound to the substrate in an amount of 1 to 1,000 $\mu g/m^2$, before depositing the rutile type crystals on the substrate.

13. A method of depositing rutile type titanium dioxide as claimed in claim 9, wherein the at least one member selected from the group consisting of platinum, a platinum compound, palladium and a palladium compound is attached to the substrate in an amount of 1 to 1,000 $\mu g/m^2$.

* * * * *